(12) United States Patent
Nijasure et al.

(10) Patent No.: US 11,263,044 B2
(45) Date of Patent: Mar. 1, 2022

(54) WORKLOAD-BASED CLOCK ADJUSTMENT AT A PROCESSING UNIT

(71) Applicants: ADVANCED MICRO DEVICES, INC., Santa Clara, CA (US); ATI TECHNOLOGIES ULC, Markham (CA)

(72) Inventors: Mangesh P. Nijasure, Orlando, FL (US); Michael Mantor, Orlando, FL (US); Ashkan Hosseinzadeh Namin, Markham (CA); Louis Regniere, Orlando, FL (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 67 days.

(21) Appl. No.: 16/692,856

(22) Filed: Nov. 22, 2019

(65) Prior Publication Data

US 2021/0157639 A1     May 27, 2021

(51) Int. Cl.
*G06F 9/48*     (2006.01)
*G06F 9/50*     (2006.01)
*G06T 1/20*     (2006.01)
*G06F 1/324*    (2019.01)

(52) U.S. Cl.
CPC ............ *G06F 9/4881* (2013.01); *G06F 1/324* (2013.01); *G06F 9/505* (2013.01); *G06F 9/5044* (2013.01); *G06T 1/20* (2013.01)

(58) Field of Classification Search
CPC ..................................................... G06F 9/4881
See application file for complete search history.

(56) References Cited

U.S. PATENT DOCUMENTS

| 10,324,667 | B2* | 6/2019 | Sakai ....................... G06F 3/122 |
| 2015/0116334 | A1 | 4/2015 | Nagai | |
| 2016/0050111 | A1* | 2/2016 | Jang ........................ G06F 13/24 |
| | | | 710/104 |
| 2018/0210530 | A1 | 7/2018 | Huang et al. |
| 2018/0232023 | A1 | 8/2018 | Culbert et al. |
| 2019/0213775 | A1 | 7/2019 | Dimitrov et al. |
| 2019/0272615 | A1 | 9/2019 | Koker et al. |

OTHER PUBLICATIONS

International Search Report and Written Opinion dated Mar. 5, 2021 for PCT/US2020/061488, 10 pages.

* cited by examiner

*Primary Examiner* — Charlie Sun (57) ABSTRACT

A graphics processing unit (GPU) adjusts a frequency of clock based on identifying a program thread executing at the processing unit, wherein the program thread is detected based on a workload to be executed. By adjusting the clock frequency based on the identified program thread, the processing unit adapts to different processing demands of different program threads. Further, by identifying the program thread based on workload, the processing unit adapts the clock frequency based on processing demands, thereby conserving processing resources.

20 Claims, 4 Drawing Sheets

WORKLOAD-BASED CLOCK ADJUSTMENT AT A PROCESSING UNIT

BACKGROUND

Processing systems often employ specialized processing units to execute specified operations for which the processing units have been designed. For example, a processing system can employ a graphics processing unit (GPU) to execute graphical and vector processing operations for the processing system. In some cases, a processing unit concurrently performs operations on behalf of different programs executing at the processing system. For example, the processing system may implement a virtualized computing environment, wherein the processing system concurrently executes multiple virtual machines (VMs) at one or more central processing units (CPU). Each of the VMs requests the GPU of the processing system to execute graphical or vector processing operations, such that the GPU is tasked with concurrently executing operations on behalf of different VMs. However, the different programs can have different requirements, such as different power requirements, different maximum clock frequency requirements, and the like. The different requirements place different processing demands on the GPU (or other processing unit) and thereby negatively impact the processing system as a whole.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for adjusting a frequency of clock at a graphics processing unit (GPU) based on identifying a program thread executing at a central processing unit (CPU), wherein the program thread is detected based on a workload to be executed. By adjusting the clock frequency based on the identified program thread, the processing unit adapts to different processing demands of the concurrently executing programs. Further, by identifying the program thread based on workload, the processing unit adapts the clock frequency based on processing demands, thereby conserving processing resources.

To illustrate via an example, in some embodiments the CPU concurrently executes two different programs (e.g., two different virtual machines). One of the programs, designated Program1, is a program that is required to execute operations at a relatively low frequency in order to, for example, maintain compatibility with other programs or systems. The other program, designated Program2, is a program that is required to execute operations, at least in some circumstances, at a relatively high frequency in order to meet performance targets. Conventionally, a clock of the GPU that concurrently executes operations for Program1 and Program2 is set to the higher of the different clock frequencies, irrespective of which program's operations are being executed at the GPU, thereby requiring additional software or hardware for Program1 to comply with its compatibility requirements. Using the techniques herein, the GPU detects which of Program1 and Program2 is executing, and whether the processing demands of the executing program are such that an adjustment in clock frequency is desirable for the executing program to meet its processing requirements, and adjust the clock frequency of the GPU accordingly. The GPU thereby satisfies the processing requirements for each of Program1 and Program2, and does so dynamically, according to changing workloads, thereby conserving processing resources.

Furthermore, changing the clock frequency based on a detected workload, rather than solely on a static condition such as a program identifier value or specified periods of time, the GPU is able to meet the processing specifications for each program based on the demands of a given workload, thereby conserving processor resources. For example, in some cases a higher-performance program may provide a relatively light workload to the GPU, such that the processing specifications are able to be with a lower clock frequency. Using the techniques herein, a GPU maintains the frequency of the clock signal at a lower frequency under relatively light workloads, even if the corresponding program is associated with a relatively high specified clock frequency, thereby conserving GPU resources when they are not required to meet program specifications.

Figure 1:
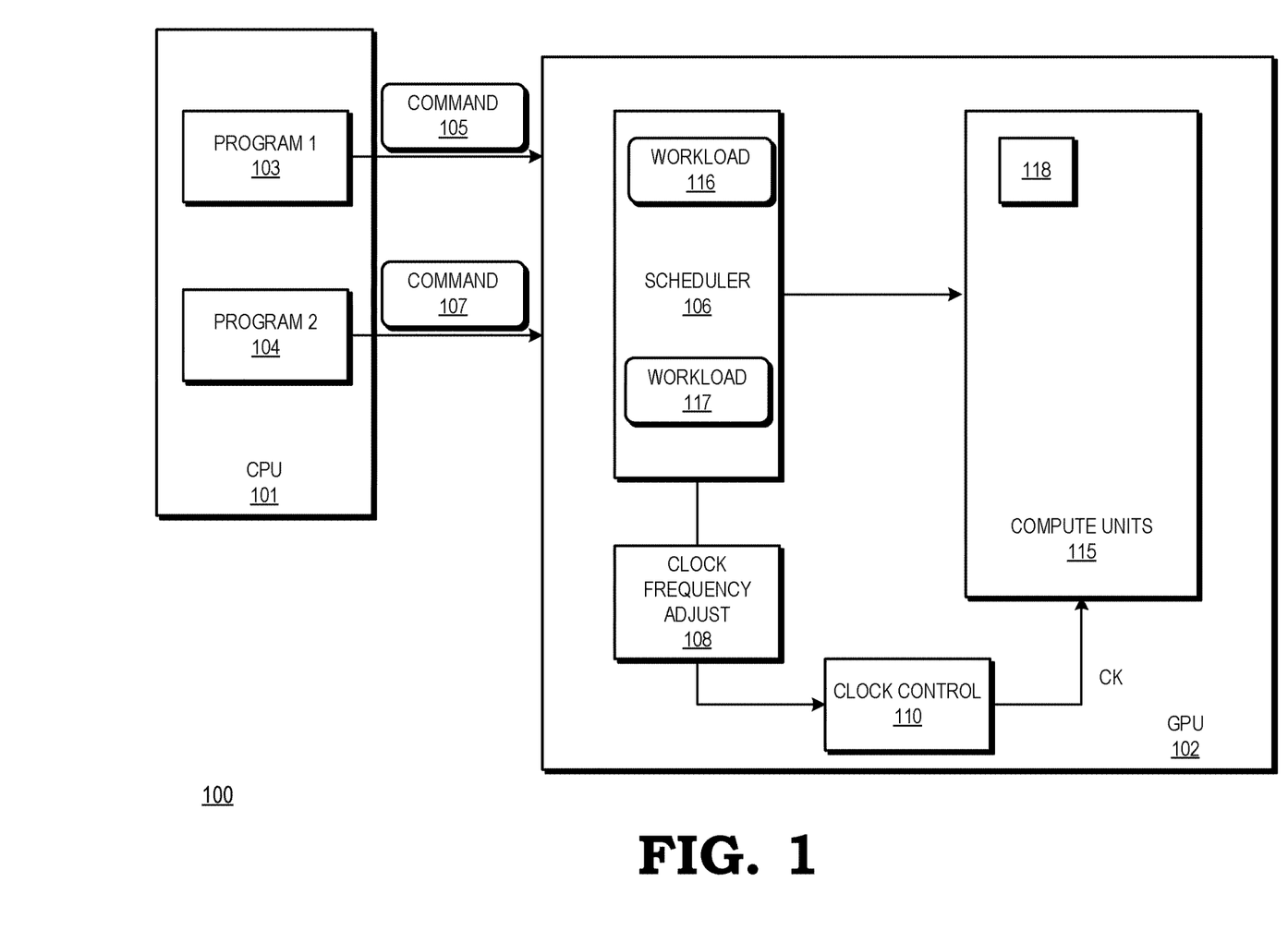
FIG. 1 is a block diagram of a processing system including a graphics processing unit (GPU) that adjusts a clock frequency based on detection of an executing program thread in accordance with some embodiments.

Turning to the Figures, FIG. 1 illustrates a block diagram of a processing system 100 including a central processing unit (CPU) 101 and a graphics processing unit (GPU) 102 in accordance with some embodiments. The processing system 100 is generally configured to execute instructions, organized as computer programs, in order to carry out tasks on behalf of an electronic device. Accordingly, in different embodiments the processing system 100 is part of an electronic device such as a desktop or laptop computer, a server, a smartphone, a tablet, a game console, and the like. The processing system 100 includes additional components and modules not illustrated at FIG. 1. For example, in some embodiments the processing system includes one or more memory controllers, input/output controllers, network interfaces, and the like, to perform tasks on behalf of the electronic device.

The CPU 101 is generally configured to execute multiple programs, and corresponding program threads concurrently. As used herein, a program thread refers to either of an individual program (e.g., an operating system, an application program, and the like) or an individual thread of a multi-threaded program. In the depicted example, the CPU 101 concurrently executes two program threads, designated program 103 and program 104. However, it will be appreciated that the techniques described with respect to FIG. 1 are, in other embodiments, implemented at a processing system concurrently executing N programs, where N is an integer greater than 1. Thus, in some embodiments, the CPU 101 implements a virtualized computing environment by concurrently executing multiple virtual machines, wherein programs 103 and 104 correspond to programs executed by different virtual machines. For example, in some embodiments program 103 is an operating system associated with one virtual machine, and program 104 is an operating system associated with a different virtual machine executing at the processing system. It is assumed for purposes of description that each of the programs 103 and 104 have different processing specifications, such as different specified processing speeds, power consumption specifications, and the like. For example, in some embodiments the program 103 is a "legacy" program that is specified to execute at a relatively low frequency in order to provide backward compatibility for other programs or hardware components of the processing system, while the program 104 is a newer program that is specified to execute at a relatively high frequency in order to meet performance targets. As described further herein, the GPU 102 is able to adjust specified parameters, and in particular a clock frequency of the GPU 102, so that each of the programs 103 and 104 complies with its processing specifications.

The GPU 102 is generally configured to perform graphical and vector processing operations for the processing system. To illustrate, in some embodiments in the course of executing the programs 103 and 104, CPU 101 generates specified commands, referred to herein as GPU commands (e.g. commands 105 and 107), requesting that the GPU 102 perform designated operations. Examples of GPU commands include draw commands, requesting that the GPU draw a designated object for display, vector commands, requesting that the GPU perform a designated vector operation, and the like. The one or more CPUs provide the GPU commands to the GPU 102 for execution. Each command is issued by, and associated with, a corresponding one of the programs 103 and 104. Thus, for example, in some embodiments the command 105 is a draw command requesting that the GPU 102 draw one or more objects on behalf of program 103, and command 107 is a draw command requesting that the GPU 102 draw one or more objects on behalf of program 104.

It will be appreciated that the CPU 101 executes the programs 103 and 104 concurrently. Thus, in some embodiments, the CPU 101 provides different commands, associated with different ones of the programs 103 and 104 to the GPU 102 in a time-multiplexed fashion for execution. To illustrate, in some embodiments, the CPU 101 provides the command 105 to the GPU 102 for execution on behalf of program 103, followed by command 107 for execution on behalf of program 104, followed by another command (not shown) for execution on behalf of program 103. As described further herein, in some cases the different programs, and therefore the different commands, have different specified processing requirements such as different required clock frequencies, in order for the programs to meet specified quality or other requirements, such as a specified display frame rate. The GPU 102 identifies the different processing requirements by analyzing workloads generated based on the commands, and adjusts processing parameters such as a clock frequency based on the identified processing requirements. The GPU 102 thereby adjusts the processing parameters dynamically, based on a combination of processing demands and specified processing requirements, rather than based on fixed processing parameter values.

To facilitate execution of the CPU commands (e.g. commands 105 and 107), the GPU 102 includes a scheduler 106 and a set of compute units 115. The set of compute units 115 includes a plurality of compute units (e.g. compute unit 118) wherein each compute unit includes multiple processing elements, such as single instruction, multiple data (SIMD) units, stream processors, and the like configured to perform graphics and vector processing operations. In some embodiments, each compute unit includes additional modules to support the processing elements, such as one or more branch units, scalar units, vector units, register files, and the like. The scheduler 106 is a module that schedules operations, in the form of wavefronts at the set of compute units 115 based on commands received from the one or more CPUs. In some embodiments, the GPU 102 includes a command processor or other module to decode the received commands into one or more operations and provides the operations to the scheduler 106 for scheduling. Further, in some embodiments the scheduler 106 is composed of different scheduling modules, with each scheduling module scheduling operations at different resources of the GPU 102. For example, in some embodiments the scheduler 106 includes a scheduling module to schedule graphics and vector processing operations at the compute units 115, a scheduling module to schedule memory operations at memory resources of the GPU 102, and the like.

To synchronize operations at the compute units 115 (as well as other modules) the GPU 102 employs a clock control module 110 to generate a clock signal CK and provides the CK signal to each of the compute units 115. In some embodiments, the clock control module 110 includes one more control loops, such as frequency locked loop (FLL) to lock the frequency of the clock signal CK to a designated frequency, wherein the designated frequency is adjustable via control signaling as described further herein. In particular, the GPU 102 sets the control signaling for the clock control module 110 to set the frequency of the clock signal CK based on the processing demands placed on the GPU 102 by the programs 103 and 104 so that each program complies with its processing specifications.

To illustrate, the overall use of the resources of the GPU 102 based on a received command, or set of commands, is referred to herein as a workload (e.g., workloads 116 and 117). A heavier or higher workload uses more of the resources of the GPU 102, while a lighter or lower workload uses fewer resources of the GPU 102. Thus, the workload generated by a particular one of the programs 103 and 104 is based on the commands generated by the program. Further, the workload generated by a program is generally correlated with the processing specifications for that program. Thus, for example, a program having a relatively high execution frequency (that is, a program that is expected or specified to execute quickly) generally generates heavier workloads (that is, workloads that require more resources for execution). In contrast, a program having a relatively low specified execution frequency generates lighter workloads (that is, workloads that require more resources for execution).

To accommodate concurrently executing programs having different specified execution frequencies, the GPU 102 includes a clock frequency adjustment module (CFAM) 108. The CFAM 108 monitors parameters indicative of the current workload of the GPU 102 and thereby, in effect, detects which of the programs 103 and 104 is presently being executed at the GPU 102 and provides control signaling to the clock control module 110 to set the frequency of the clock signal CK to the specified clock frequency for the detected program. Examples of the parameters monitored by CFAM 108 include, in some embodiments, the number of wavefronts scheduled by the scheduler 106 at the compute units 115 in a specified amount of time, the number of draw commands received by the GPU 102 in a specified amount of time, the type of draw or dispatch command, a hint provided by a compiler, and the like, or any combination thereof. If the monitored parameters exceed a workload threshold, the CFAM 108 increases the frequency of the CK signal to a higher specified frequency $F_2$. In response to the monitored parameters falling below the workload threshold for a specified amount of time, the CFAM 108 reduces the clock frequency of the CK signal to a lower specified frequency $F_1$. In some embodiments, the higher and lower specified frequencies $F_2$ and $F_1$ are indicated by the programs 103 and 104 during initialization of the corresponding program, via a command provided by each program to the GPU 102, and the like. Further, in some embodiments, the workload threshold and the frequencies $F_1$ and $F_2$ are programmable values, allowing a programmer to tune performance of the executing programs to a desired level.

To illustrate via an example, in some embodiments the parameter monitored by the CFAM 108 is the number of draw commands received from each of the programs 103 and 104 and scheduled for execution by the scheduler 106. In response to the number of draw commands in a specified amount of time exceeding a specified workload threshold (e.g. more than ten draw commands over 100 execution cycles) the CFAM 108 assumes that the program associated with a higher specified clock frequency is executing, and is demanding a high number of resources. In response, the CFAM 108 increases the frequency of the CK signal to the higher specified frequency $F_2$. When the number of received draw commands falls below the specified workload threshold, the CFAM 108 assumes that the program associated with a lower specified frequency is executing. In response, the CFAM 108 reduces the frequency of the CK signal to the lower specified frequency $F_1$.

As another example, in some embodiments the parameter monitored by the CFAM 108 is the number of wavefronts scheduled for execution at the compute units 115 by the scheduler 106. In response to the number of scheduled wavefronts exceeding a workload threshold (e.g. more than 100 wavefronts over 500 execution cycles) the CFAM 108 assumes that the program associated with a higher specified clock frequency is executing, and is demanding a high number of resources. In response, the CFAM 108 increases the frequency of the CK signal to the higher specified frequency $F_2$. When the number of scheduled wavefronts falls below the specified workload threshold, the CFAM 108 assumes that the program associated with a lower specified frequency is executing. In response, the CFAM 108 reduces the frequency of the CK signal to the lower specified frequency $F_1$.

In other embodiments, the parameter monitored by the CFAM 108 is the number of draw commands of a specified type, such as the number of draw commands to draw a specified object, an object having a threshold number of vertices, and the like. The CFAM 108 determines the type of draw command from command parameters included with the commands 105 and 107. For example, in some embodiments each command indicates the type of object to be drawn, the number of vertices of the object, and the like. In other embodiments these parameters are identified by a command processor of the GPU 102.

As indicated by the above examples, in some embodiments the CFAM 108 identifies the workload of the GPU based on information stored or monitored at the scheduler 106. For example, in some embodiments the scheduler 106 maintains registers or other memory structures that store data indicative of the number of draw commands received from the CPU 101, the types of received draw commands, the number of wavefronts scheduled for execution, and the like, or any combination thereof. Based on the stored information, the CFAM 108 identifies an overall workload for the GPU 102, and adjusts the clock frequency of the CK clock signal as described herein.

By changing the clock frequency based on a detected workload, rather than solely on a static condition such as a program identifier value or specified periods of time, the GPU 102 is able to meet the processing specifications for each program dynamically, thereby conserving processor resources. For example, in some cases the higher-performance program may provide a relatively light workload to the GPU 102 (e.g., to execute a relatively simple draw command), resulting in the GPU 102 maintaining the frequency of the CK signal at the lower frequency $F_1$. In contrast, if the GPU 102 altered the clock frequency solely based on a static condition such as a program identifier, the frequency of the CK signal would be increased to the higher frequency without a commensurate performance benefit.

Figure 2:
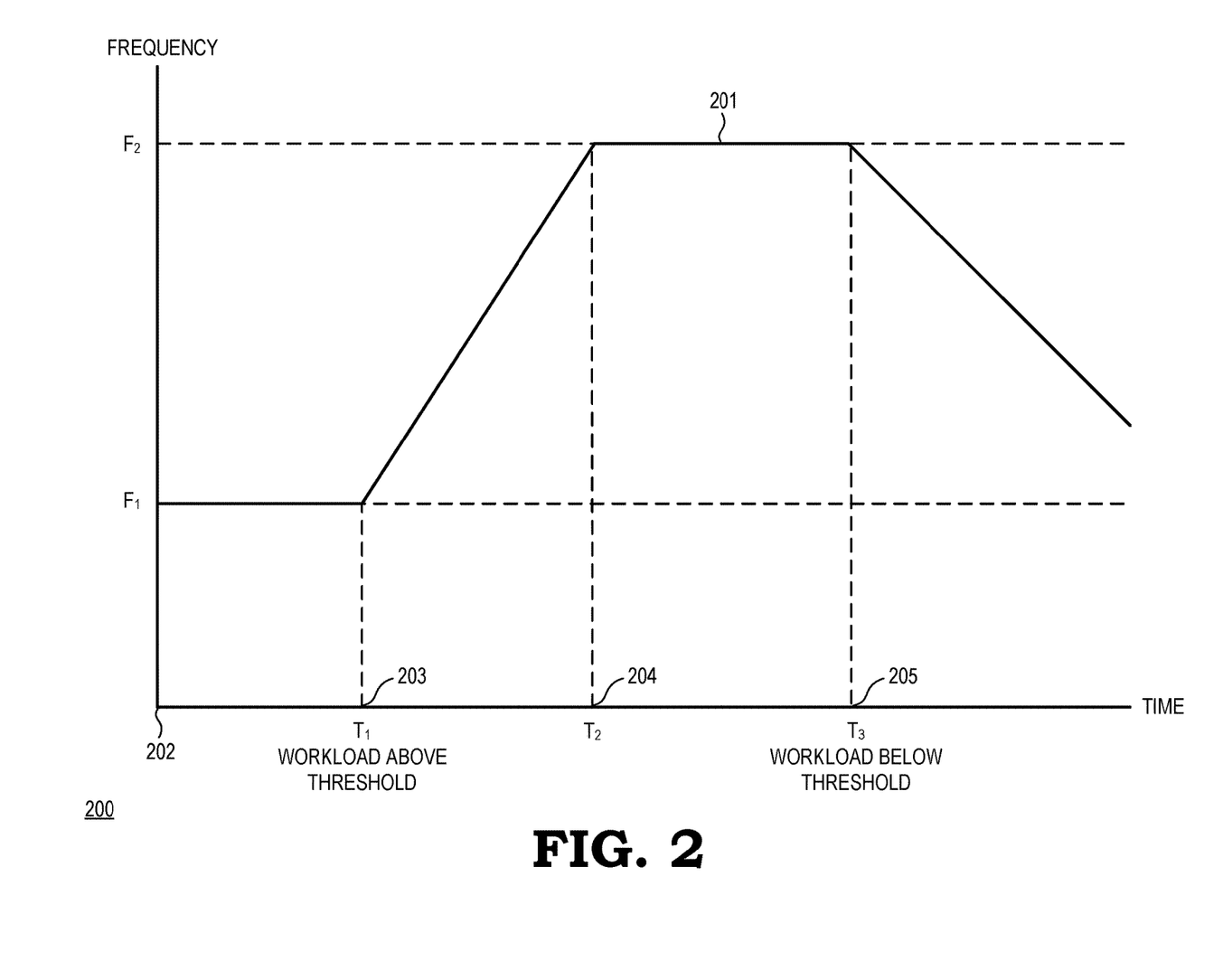
FIG. 2 is a diagram illustrating an example of the GPU of FIG. 1 adjusting a clock frequency based on changes in a workload of the GPU in accordance with some embodiments.

FIG. 2 illustrates a diagram 200 depicting an example of the CFAM 108 adjusting the frequency of the clock signal CK based on a detected workload in accordance with some embodiments. The diagram 200 depicts an x-axis representing time and a y-axis representing the frequency of the clock signal CK. The diagram 200 further depicts a plot 201, representing an example of the frequency of the clock signal CK as it changes over time.

In the example of FIG. 2, it is assumed that the program 103 is associated with a lower specified frequency, designated $F_1$ and the program 104 is associated with a higher specified frequency. In the illustrated example of plot 201, at an initial time 202 the workload of the GPU 102 is below a workload threshold, as indicated by one or more workload parameters. This indicates that the GPU 102 is likely executing commands on behalf of program 103. Accordingly, and in response to the workload being below the workload threshold, the CFAM 108 sets the frequency of the clock signal CK to the lower frequency $F_1$.

At a time 203 after time 202, the workload at the GPU 102 has increased, such that the workload is above the workload threshold. The workload therefore indicates that the GPU 102 is executing commands on behalf of program 104. Accordingly, and in response to the workload increasing above the workload threshold, the CFAM 108 begins increasing the frequency of the clock signal CK until, at a time 204, the frequency has reached the higher specified frequency $F_2$. As illustrated, the CFAM 108 ramps the clock signal from the frequency $F_1$ to the frequency $F_2$ over time (between time 203 and time 204), rather than immediately setting the clock frequency to $F_2$ at time 203. In some embodiments, the time between time 203 and time 204 is 50 micro-seconds or less. By ramping the clock from the frequency $F_1$ to the frequency $F_2$, the GPU 102 continues to execute operations between times 203 and 204, rather than stopping execution and flushing data from the compute units 115.

Between time 204 and a time 205, the workload of the GPU 102 is above the workload threshold, and in response the CFAM 108 maintains the frequency of the clock signal CK at the higher frequency $F_2$. At time 205, the workload of the GPU 102 falls below the threshold. In response, the CFAM 108 begins ramping the frequency of the clock signal CK to return to the lower frequency $F_1$. In some embodiments, the CFAM 108 employs hysteresis to prevent brief excursions around the workload threshold from causing frequent adjustments to the frequency of the clock signal CK. For example, in some embodiments the CFAM 108 initiates adjustment of the clock signal frequency in response to the workload of the GPU 102 being above the threshold for a specified amount of time.

Figure 3:
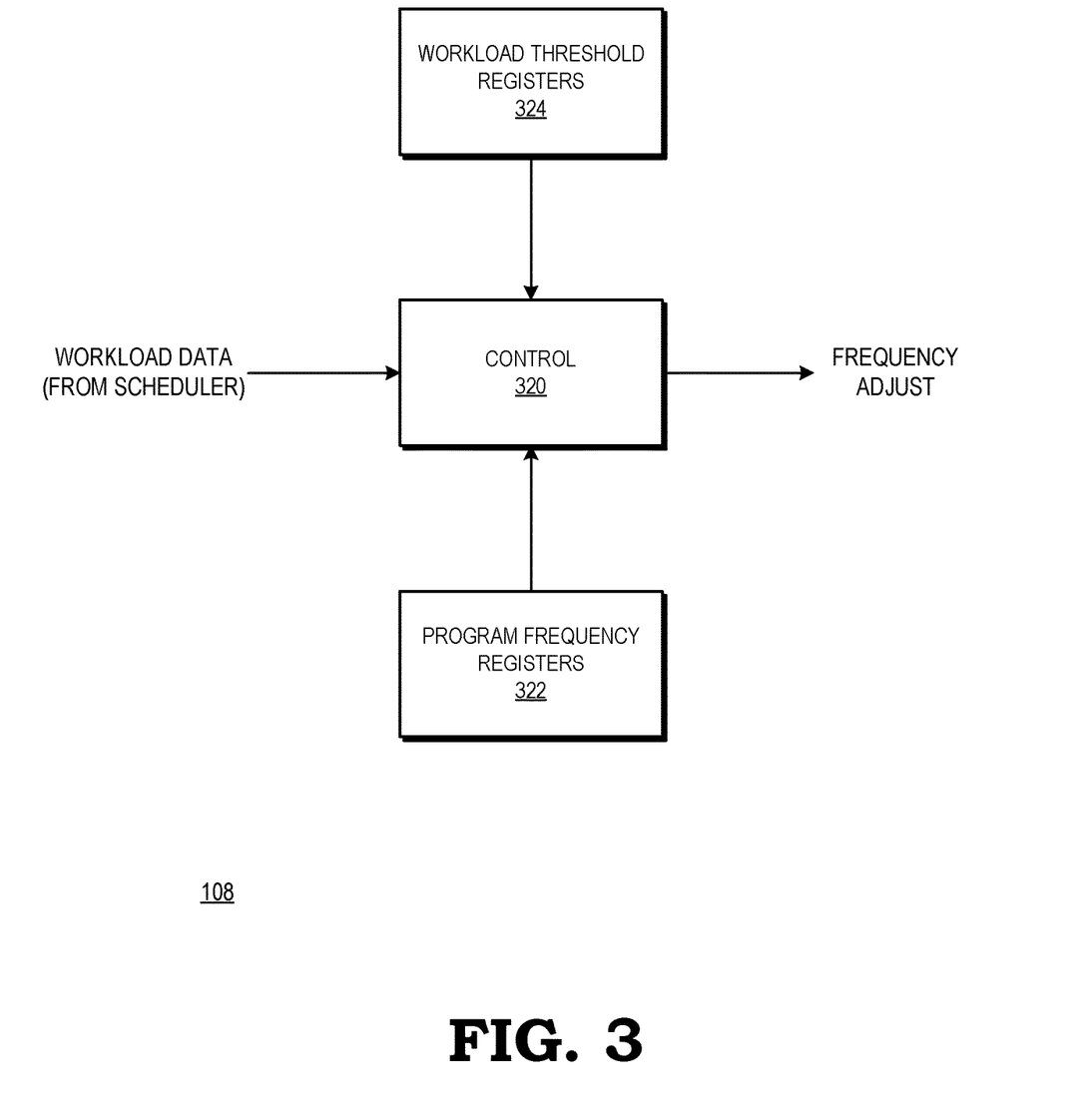
FIG. 3 is a block diagram of a clock frequency adjustment module of the GPU of FIG. 1 in accordance with some embodiments.

FIG. 3 illustrates an example of the CFAM 108 in accordance with some embodiments. In the depicted example, the CFAM 108 includes a control module 320, a set of program frequency registers 322, and a set of workload threshold registers 324. The program frequency registers 322 are a set of programmable registers that store frequency values for each program executing at the processing system of GPU 102. In some embodiments, each executing program sends commands to the GPU 102 via a device driver. When a program begins execution at the processing system, the program sends the device driver frequency information indicating the specified execution frequency for the program. In response, the device driver programs a corresponding one of the program frequency registers 322 with the specified execution frequency for the program.

The workload threshold registers 324 are a set of programmable registers that store workload thresholds for each program executing at the processing system of the GPU 102. In some embodiments, each executing program is associated with a workload profile, indicating the likely workloads generated by the program. In some embodiments, the workload profile is generated by a software developer during development of the program. In other embodiments, the workload profile is developed by the GPU 102 during the first N times the program is executed, where N is an integer. For example, the first N times the program is executed, the GPU 102 employs a performance monitor (not shown) to measure the workload generated by the program, such as the number of wavefronts scheduled for execution on behalf of the program, the number of draw commands issued by the CPU 101 on behalf of the program, and the like. The control module 320 generates a workload threshold value indicating the average workload of the program (e.g., the average number of wavefronts or average number of draw commands generated by the program, or a combination thereof) and stores the workload threshold value at a corresponding one of the workload threshold registers 324.

In operation, when at least two programs are being concurrently executed at the processing system of the GPU 102, the control module 320 receives from the scheduler 106 information, such as the number of scheduled wavefronts or number of received draw commands in a specified amount of time. The control module 320 compares the workload information to the workload thresholds stored at the workload threshold registers 324. In response to a workload threshold being exceeded, the control module 320 determines the program associates with the exceeded threshold, and retrieves the program frequency for the program from the program frequency registers 322. The control module 320 then sends control signaling to the clock control module 110 to adjust the frequency of the CK clock signal to the retrieved program frequency.

In response to the workload information indicating that the GPU workload has fallen below a workload threshold, the control module 320 determines the program associated with the next-lower workload threshold stored at the workload threshold registers 324. The control module 320 retrieves the program frequency for the identified program from the program frequency registers 322 and sends control signaling to the clock control module 110 to adjust the frequency of the CK clock signal to the retrieved program frequency.

Figure 4:
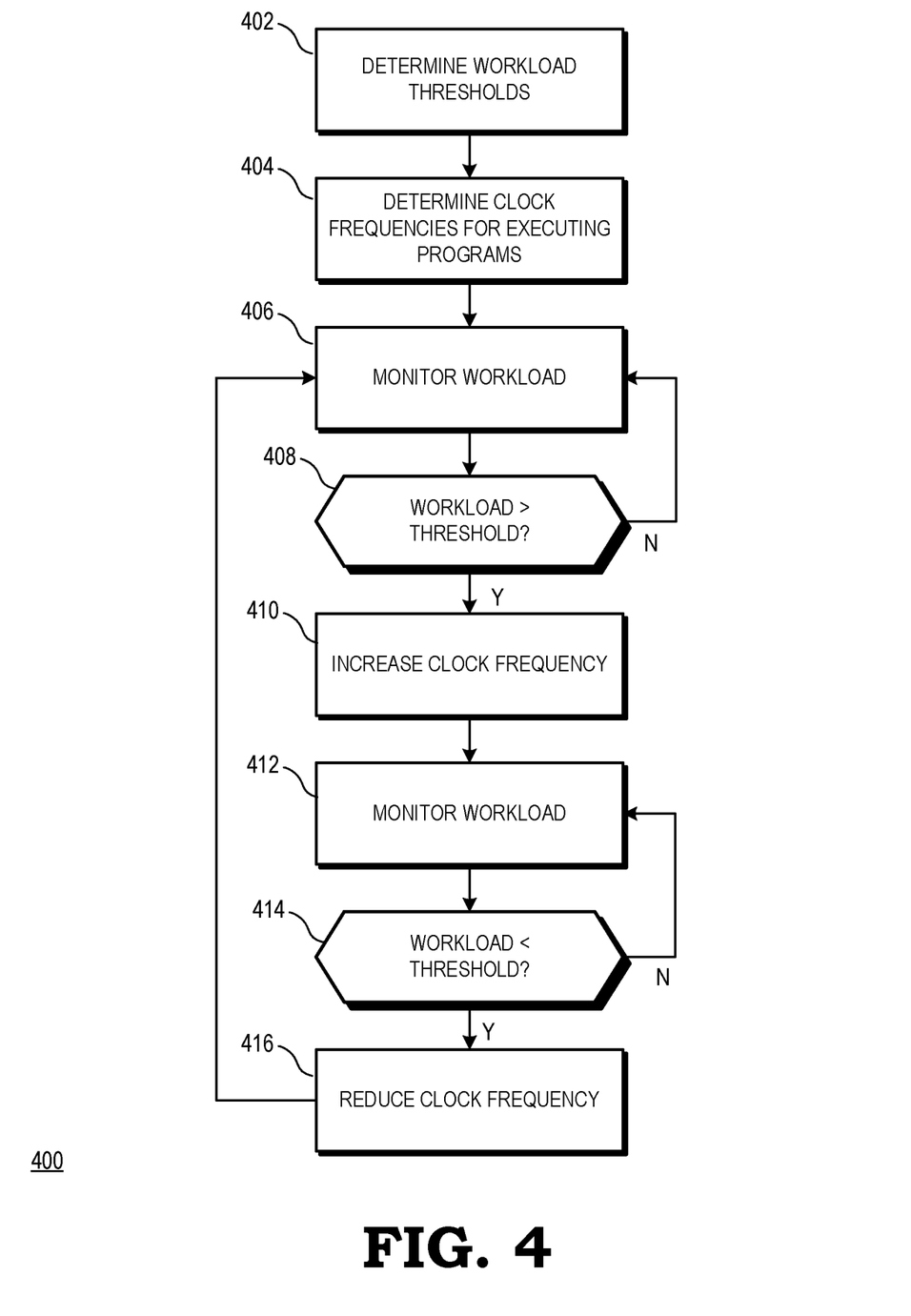
FIG. 4 is a flow diagram of a method of adjusting a clock frequency of a processing unit based on detecting an executing program thread in accordance with some embodiments.

FIG. 4 illustrates a flow diagram of a method 400 of setting a frequency of a clock signal at a processing unit based on identifying an executing program as indicated by a detected workload in accordance with some embodiments. For purposes of description, the method 400 is described with respect to an example implementation at the GPU 102 of FIG. 1, but it will be appreciated that in other embodiments the method 400 is implemented at other processing units and other processing systems. Turning to the flow diagram, at block 402 the GPU 102 determines the workload thresholds for each program being executed at the processing system. As noted above, in some embodiments each executing program provides a workload threshold upon initialization based upon a workload profile created during development of the program. In other embodiments, the GPU 102 identifies the workload threshold for an executing program by determining the average workload generated by the program during the first N times the program is executed. In still other embodiments, the GPU 102 is configured to record the workload generated by an executing program each time the program is executed, and to determine the workload threshold by determining the average workload generated by the program over the last M times the program was executed, where M is an integer. The GPU 102 records the workload threshold at a corresponding register of the workload threshold registers 324.

At block 404, the GPU 102 determines the specified clock frequencies for the programs being concurrently executed at the processing system. As indicated above, in some embodiments the specified clock frequency is provided to the GPU 102 by each executing program via a device driver. The GPU 102 stores the specified clock frequencies at corresponding ones of the program frequency registers 322.

At block 406, the CFAM 108 monitors the workload of the GPU 102 based on information provided by the scheduler 106, such as the number of wavefronts scheduled at the compute units 115, the number of draw commands received by the GPU 102 in a specified amount of time, and the like. At block 408, the CFAM 108 determines if the workload has exceeded one of the workload thresholds stored at the workload registers 324. If not, the method returns to block 406 and the CFAM 108 maintains the clock speed of the CK clock signal at a current frequency.

If, at block 408, the CFAM 108 determines that the workload has exceeded a workload threshold, the CFAM 108 identifies the program associated with the exceeded threshold, and further determines the specified program frequency for the program as stored at the program frequency registers 322. At block 410 the CFAM 108 sends control signaling to the clock control module 110 to adjust the frequency of the CK clock signal to the specified program frequency.

The method flow moves to block 412 and the CFAM 108 continues to monitor the workload of the GPU 102 based on information provided by the scheduler 106. At block 414, the CFAM 108 determines if the workload has fallen below the workload threshold stored at the workload registers 324. If not, the method returns to block 412 and the CFAM 108 maintains the clock speed of the CK clock signal at a current frequency. In response to the workload falling below the workload threshold, the method flow moves to block 416 and the CFAM 108 sends control signaling to the clock control module 110 to return the frequency of the CK clock signal to the initial lower frequency. The method flow returns to block 406 and the CFAM 108 continues to monitor the workload of the GPU 102.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
   in response to receiving a plurality of commands from a central processing unit (CPU), determining, at a graphics processing unit (GPU), a first workload to be executed at the GPU based on at least one of the plurality of commands;
   identifying, based on the first workload, a first program thread of a plurality of program threads concurrently executing at the CPU; and
   in response to identifying the first program thread, adjusting a clock signal of the GPU to a specified clock frequency associated with the first program thread.

2. The method of claim 1, wherein:
   identifying the first program thread comprises identifying the first program thread in response to the first workload exceeding a first workload threshold.

3. The method of claim 2, further comprising:
   determining, at the GPU, a second workload to be executed at the GPU after the first workload based on at least one other command of the plurality of commands;
   identifying, based on the second workload, a second program thread of the plurality of program threads concurrently executing at the CPU; and
   in response to identifying the second program thread, adjusting the clock signal of the GPU from the specified clock frequency associated with the first program thread to the specified clock frequency associated with the second program thread.

4. The method of claim 3, wherein:
   identifying the second program thread comprises identifying the second program thread in response to the second workload being below a second workload threshold.

5. The method of claim 2, wherein the first workload threshold is programmable.

6. The method of claim 1, wherein determining the first workload comprises determining the first workload further based on information received at a scheduler of the GPU.

7. The method of claim 1, wherein determining the first workload comprises determining the first workload further based on a number of wavefronts scheduled for execution at a set of compute units of the GPU.

8. The method of claim 1 wherein determining the first workload comprises determining the first workload further based on a type of draw command received at the GPU.

9. The method of claim 1, wherein adjusting the clock signal of the GPU comprises ramping the clock signal from a second frequency to the specified clock frequency associated with the first program thread.

10. A method, comprising:
    identifying a first program thread, of a plurality of program threads, based on a first workload to be executed at a graphics processing unit (GPU), wherein the GPU is executing workloads on behalf of the plurality of program threads, and the plurality of program threads are concurrently executed at a central processing unit (CPU); and
    in response to identifying the first program thread, adjusting a clock of the GPU to a first frequency associated with the first program thread.

11. The method of claim 10, wherein:
    identifying the first program thread comprises identifying the first program thread in response to the first workload exceeding a first workload threshold.

12. The method of claim 11, further comprising:
identifying a second program thread of the plurality of program threads based on a first workload to be executed at the GPU; and
in response to identifying the second program thread, adjusting the clock of the GPU to a second frequency associated with the second program thread.

13. The method of claim 10, wherein adjusting the clock comprises ramping the clock from a second frequency to the first frequency.

14. A graphics processing unit (GPU), comprising:
a scheduler to receive, from a central processing unit (CPU) a plurality of commands associated with a plurality of program threads concurrently executing at the CPU;
a plurality of compute units configured to execute workloads based on the plurality of commands;
a clock control module to generate a first clock signal for the plurality of compute units; and
a clock frequency adjustment module configured to:
determine a first workload to be executed at the plurality of compute units;
identify, based on the first workload, a first program thread of the plurality of program threads concurrently executed at the CPU; and
in response to identifying the first program thread, adjust the first clock signal to a specified clock frequency associated with the first program thread.

15. The GPU of claim 14, wherein the clock frequency adjustment module is configured to:
identify the first program thread in response to the first workload exceeding a first workload threshold.

16. The GPU of claim 15, wherein the clock frequency adjustment module is configured to:
determine a second workload to be executed at the plurality of compute units;
identify, based on the second workload, a second program thread; and
in response to identifying the second program thread, adjust the first clock signal from the specified clock frequency associated with the first program thread to a second specified clock frequency associated with the second program thread.

17. The GPU of claim 16, wherein the clock frequency adjustment module is configured to:
identify the second program thread in response to the second workload being below a second workload threshold.

18. The GPU of claim 15, wherein the first workload threshold is programmable.

19. The GPU of claim 14, wherein the clock frequency adjustment module is configured to determine the first workload based on a number of wavefronts scheduled at a set of compute units of the GPU.

20. The GPU of claim 14, wherein the clock frequency adjustment module is configured to determine the first workload based on a number of draw commands received at the scheduler.

* * * * *